United States Patent [19]
Nelson, Jr.

[11] Patent Number: 6,016,117
[45] Date of Patent: Jan. 18, 2000

[54] METHOD FOR THE EFFICIENT DETERMINATION OF GPS SATELLITE ORBITAL POSITION

[75] Inventor: Robert Leonard Nelson, Jr., Austin, Tex.

[73] Assignee: Trimble Navigation Limited, Sunnyvale, Calif.

[21] Appl. No.: 09/105,595

[22] Filed: Jun. 26, 1998

[51] Int. Cl.[7] .................................................. H04B 7/185
[52] U.S. Cl. .................... 342/352; 342/357.15; 701/226
[58] Field of Search ........................ 342/357.01, 357.02, 342/357.06, 357.12, 357.13, 357.15, 352; 701/226

[56] References Cited

U.S. PATENT DOCUMENTS 3,271,565  9/1966  Blackman ............................... 701/226
4,912,475  3/1990  Counselman, III ..................... 342/352

Primary Examiner—Thomas H. Tarcza
Assistant Examiner—Fred H. Mull
Attorney, Agent, or Firm—Wagner, Murabito & Hao LLP

[57] ABSTRACT

A GPS navigation receiver which calculates the GPS satellites' positions by numerical integration. The GPS receiver of the present invention integrates over eccentric anomaly E as an independent variable rather than time, in order to use an integration method that is exact for sinusoidal motion, since the components of motion and time are sinusoidally related to the eccentric anomaly E. Using eccentric anomaly as an independent variable, the GPS receiver performs Leapfrog integration on a first sample and a second sample to determine a subsequent sample. The subsequent sample is uniformly spaced with respect to eccentric anomaly in comparison to the first sample and the second sample. The Leapfrog integration of the present invention is computationally efficient and exact over longer step sizes.

19 Claims, 5 Drawing Sheets

METHOD FOR THE EFFICIENT DETERMINATION OF GPS SATELLITE ORBITAL POSITION

TECHNICAL FIELD

The present invention relates generally to global positioning system (GPS) satellite ephemerides. More specifically, the present invention relates to a method for efficiently determining GPS satellite orbital position.

BACKGROUND ART

The Navstar Global Positioning System, hereafter referred to simply as GPS, is a space based radio positioning network for providing users equipped with suitable receivers highly accurate position, velocity, and time (PVT) information. Developed by the United States Department of Defense (DOD), the space based portion of GPS comprises a constellation of GPS satellites in non-geosynchronous 12 hour orbits around the earth.

Prior art FIG. 1 shows the constellation 100 of GPS satellites 101 in orbit. The GPS satellites 101 are located in six orbital planes 102 with four of the GPS satellites 101 in each plane, plus a number of "on orbit" spare satellites (not shown) for redundancy. The orbital planes 102 of the GPS satellites 101 have an inclination of 55 degrees relative to the equator and an altitude of approximately 20,200 km (10,900 miles) and typically complete an orbit in approximately 12 hours. This positions each of the GPS satellites 101 in such a manner that a minimum of five of the GPS satellites 101 are normally observable (above the horizon) by a user anywhere on earth at any given time.

GPS position determination is based upon a concept referred to as time of arrival (TOA) ranging. Each of the orbiting GPS satellites 101 broadcasts spread spectrum microwave signals encoded with positioning data and satellite ephemeris information. The signals are broadcast on two frequencies, L1 at 1575.42 MHz and L2 at 1227.60 MHz, modulated using bi-phase shift keying techniques. Essentially, the signals are broadcast at precisely known times and at precisely known intervals. The signals are encoded with their precise time of transmission. A user receives the signals with a GPS receiver designed to time the signals and to demodulate the satellite orbital data contained in the signals. Using the orbital data, the GPS receiver determines the time between transmission of the signal by the satellite and reception by the receiver. Multiplying this by the speed of light gives what is termed the pseudo range measurement of that satellite. If the GPS receiver clock were perfect, this would be the range measurement for that satellite, but the imperfection of the clock causes it to differ by the time offset between actual time and receiver time. Thus, the measurement is called a pseudo range, rather than a range. However, the time offset is common to the pseudo range measurements of all the satellites. By determining the pseudo ranges of four or more satellites, the GPS receiver is able to determine its location in three dimensions, as well the time offset. Thus, a user equipped with a proper GPS receiver is able to determine his PVT with great accuracy, and use this information to navigate safely and accurately from point to point, among other uses.

As described above, the broadcast signals from the GPS satellites include satellite ephemeris information, essentially a set of orbital parameters, in addition to a precise time of transmission. The ephemeris information from each respective satellite provides a precise description of that satellite's orbit, referred to as the ephemeris, and more simplified descriptions of all the GPS satellite orbits, referred to as almanacs. Each ephemeris precisely characterizes its respective satellite's path by giving the parameters of a Keplerian orbit and several associated corrections to that orbit. This information is required to determine accurate pseudo range measurements to the respective satellite. Generally, the ephemeris information is used to calculate the positions of the GPS satellite with respect to earth-centered earth-fixed coordinates, and in turn, with respect to the GPS receiver. These positions are used in the TOA ranging calculations to determine the pseudo ranges and the time offset.

Specifically, the ephemeris for a given satellite comprises:

a) The square-root of the semi-major orbital axis, which is half the greatest dimension of the elliptical orbit. The square-root ranges from 0 to about 8192 square-root-meters, corresponding to a semi-major axis a of about 67 megameters, with a resolution corresponding to about 20 millimeters for the typical orbit that has a semi-major axis of 26560 kilometers. Transmission of the square-root rather than the semi-major axis itself allows calculation of the mean motion $n_0$, which is the average orbital angular velocity, without using a square-root operation:

$$n_0 = (\mu/a^3)^{0.5} = \mu^{0.5}/(a^{0.5})^3$$

where $\mu$ is the earth's gravitational parameter, commonly the WGS-84 value of 398600.5 kilometers-cubed-per-second-squared. The value of $n_0$ is typically 146 microradians-per-second, corresponding to about 3874 meters-per-second.

b) The ephemeris reference time of the week $T_0$, which is the time from the beginning of the current GPS week to a time near the middle of the time interval for which the ephemeris is valid. The reference time $T_0$ is an integer multiple of 16 seconds. Time $T_0$ is commonly subtracted from the given time of interest T to get ephemeris time t, that is, time referred to the ephemeris's epoch:

$$t = T - T_0$$

c) The mean-motion difference $\Delta n$, which is a correction to the mean motion no as computed above:

$$n = n_0 \Delta n$$

The range of $\Delta n$ corresponds to about ±311 millimeters-per-second with a resolution of about 9.5 micrometers-per-second for a typical orbit.

d) The reference-time mean anomaly $M_0$, which is the angle of the satellite at the reference time $T_0$ from perigee which would result from uniform angular motion. Perigee is the point in the orbit closest to the earth. The resolution of $M_0$ corresponds to about 39 millimeters for a typical orbit. $M_0$ is used to find the satellite's mean anomaly M at ephemeris time t:

$$M = M_0 nt$$

e) The orbital eccentricity e, which is the fraction of the semi-major axis by which the earth is distant from the orbital center. The dimensionless fraction e ranges from 0 to 0.03 with a resolution corresponding to about 3 millimeters for a typical orbit. Kepler's equation relates mean anomaly M to eccentric anomaly E, which is the actual at the reference time $T_0$ about the orbital center from perigee to the satellite:

$$M = E - e \sin E$$

Kepler's equation is commonly solved iteratively to get eccentric anomaly E from mean anomaly M. True anomaly v, which is the actual angle about the earth's center from perigee to the satellite, is commonly calculated from eccentric anomaly E by any of various formulas, for example:

$$v = 2\arctan\left[\left(\frac{1+e}{1-e}\right)^{.5} \tan(E/2)\right]$$

f) The argument of perigee ω, which is the angle about the earth's center from the ascending node to perigee. The ascending node is the intersection of the orbit with the plane of the equator at which the satellite passes from the southern to the northern hemisphere. The resolution of ω corresponds to about 39 millimeters for a typical orbit. The argument of perigee ω is commonly added to the true anomaly v to get the uncorrected argument of latitude Φ, which is the angle about the earth's center from the ascending node to the satellite:

$$\Phi = \omega + v$$

g) The second-harmonic correction coefficients $C_{uc}$ and $C_{us}$ to the argument of latitude Φ. The ranges of $C_{uc}$ and $C_{us}$ correspond to about ±1621 meters with a resolution of about 49 millimeters for a typical orbit. They multiply the cosine and sine respectively of twice the uncorrected argument of latitude Φ to correct the argument of latitude u:

$$u = \Phi + C_{us} \cos 2\Phi + C_{us} \sin 2\Phi$$

h) The second-harmonic correction coefficients $C_{rc}$ and $C_{rs}$ to the radius r. The ranges of $C_{rc}$ and $C_{rs}$ are about ±1024 meters with a resolution of about 31 millimeters. They multiply the cosine and sine respectively of twice the uncorrected argument of latitude Φ to correct the radius r:

$$r = a(1 - e \cos E) + C_{rc} \cos 2\Phi + C_{rs} \sin 2\Phi$$

The argument of latitude u and the radius r are commonly combined to calculate the satellite's position in the orbital plane (x',y'):

$$x' = r \cos u$$
$$y' = r \sin u$$

i) The orbital inclination $i_0$ at the reference time, which is the angle that the orbital plane makes with the plane of the equator, typically about 55 degrees. The resolution of $i_0$ corresponds to about 39 millimeters for a typical orbit.

j) The rate of orbital inclination $\dot{i}$. The range of $\dot{i}$ corresponds to ±155 millimeters-per-second with a resolution of about 9.5 micrometers-per-second for a typical orbit.

k) The second-harmonic correction coefficients $C_{ic}$ and $C_{is}$ to the inclination i. The ranges of $C_{ic}$ and $C_{is}$ correspond to about ±1621 meters with a resolution of about 49 millimeters for a typical orbit. They multiply the cosine and sine respectively of twice the uncorrected argument of latitude Φ to correct the inclination i:

$$i = i_0 + \dot{i}t + C_{uc} \cos 2\Phi + C_{us} \sin 2\Phi$$

l) The right ascension of the ascending node at the reference time $\Omega_0$, which is the angle measured eastward from the vernal equinox to the ascending node. The resolution of $\Omega_0$ corresponds to about 39 millimeters for a typical orbit.

l) The rate of right ascension $\dot{\Omega}$. The range corresponds to about ±80 meters-per-second with a resolution of about 9.5 micrometers-per-second for a typical orbit. $\Omega_0$ and $\dot{\Omega}$ are commonly combined with $\dot{\Omega}_e$, the WGS-84 earth's rotation rate, to calculate the ascending node's longitude:

$$\Omega = \Omega_0 \Omega t - \Omega_e T$$

The ascending node's longitude Ω and the inclination i are commonly combined with the satellite's position in the orbital plane to get the satellite's position in earth-centered earth-fixed coordinates (x, y, z):

$$x = x' \cos \Omega - y' \cos i \cos \Omega$$
$$y = x' \sin \Omega + y' \cos i \cos \Omega$$
$$z = y' \sin i$$

The above calculations describe the GPS satellite orbit as a function of time. In other words, for a given time, the equations yield the position of a given GPS satellite in its orbit. As described above, the positions of the various GPS satellites are required in order to compute pseudo ranges. Time is used as an input variable to the above equations. Using the above equations and parameters transmitted from the GPS satellites, a computer system (e.g., embedded within a GPS receiver) computes time referenced position fixes for the GPS satellites. The above equations are standardized in a GPS technical specification, "Navstar GPS Space Segment/Navigation User Interface," ICD-GPS-200 Revision A, Table 20-IV, Rockwell International Corporation, Downey, Calif., 1984, and are well known and widely used. Those desiring additional or more detailed information are referred to the above document, which is incorporated herein as background material.

The problem with the above ICD-GPS-200 equations is that the iterative solution of Kepler's equation (upon which the ICD-GPS-200 equations are based) and the many transcendental functions involved require more computation than is practical for many applications. For example, a typical GPS navigation receiver in an aircraft needs to compute an updated GPS position of the aircraft at least, on average, once per second. This requires the computation of pseudo ranges from at least four GPS satellites, which in turn, requires the determination of the positions of those GPS satellites at least once per second. In more demanding cases, for example, where the GPS position of the satellite is updated several times per second, the computational load of iteratively solving for the positions of the GPS satellites using the ICD-GPS-200 equations may be unworkable.

One technique for reducing this computational load is interpolation. The interpolation technique involves solving for samples of GPS satellite position over a relatively long period of time, and then determining interpolated GPS satellite positions between the solved positions. Interpolation involves a trade-off among position accuracy, frequency of calculation, and the complexity of the interpolation, which is commonly in the form of a polynomial in time. Generally, for a given GPS satellite, several samples are calculated using the ICD-GPS-200 equations. A polynomial curve is then numerically fitted to the samples. This curve allows positions between the samples to be determined through interpolation. The GPS satellite's position at a particular time is determined using the polynomial. In so doing, numerous satellite positions can be determined even though only a much smaller number of samples are actually computed. This greatly reduces the computational load required for maintaining high update rates in GPS navigation systems. Accordingly, the interpolation technique is well established within the GPS industry and widely used. Most GPS navigation systems implement the interpolation technique for providing GPS position fixes.

Another technique for reducing the computational load is numerical integration. Numerical integration avoids the transcendental functions and iteration completely, except for an initialization. Numerical integration also involves a trade-off, among position accuracy, frequency of iteration, and the complexity of the integration step. In order to hold reasonable accuracy over the one-hour duration of even the shortest GPS ephemeris, conventional integration must iterate far too often to be at all practical. Accordingly, the use of the numerical integration is not currently supported in current GPS navigation systems.

It should be appreciated that although the numerical integration technique is not currently used for computing GPS satellite samples, an unconventional form of numerical integration, "Leapfrog" integration, has advantages for a lossless system, like a Keplerian orbit. For examples and more detailed discussion, refer to Robert Leonard Nelson, Jr., and Hercule Kwan, "'Leapfrog' Methods for Numerical Solution of Differential Equations, Sinewave Generation, and Magnitude Approximation," IEEE Asilomar Conference, October, 1995. In general, Leapfrog numerical integration updates position and velocity on alternate half-intervals rather than aligned in time:

Increment $\dot{p}$ by $f(p)\delta t = -\mu p \|p\|^{-3} \delta t$

Increment $p$ by $\dot{p}$ $\delta t$ where p is the position vector at the ends of the intervals, $\dot{p}$ is velocity at the midpoints, $\mu$ is the earth's gravitational constant, and $\delta t$ is the time step.

Leapfrog integration accumulates no radial error for circular motion, as is the case with a perfectly circular orbit. Furthermore, a simple update-multiplier adjustment eliminates along-orbit error:

Decrement $\dot{p}$ by $2(p\Omega) \sin (\dot{\Omega} \delta t/2)$

Increment $p$ by $2(\dot{p}/\dot{\Omega}) \sin (\dot{\Omega} \delta t/2)$ where $\dot{\Omega}$ is angular velocity and $\dot{\Omega}$ $\delta t/2$ is the angle step. A re-formulation avoids multiplication:

Decrement $(\dot{p}/\dot{\Omega})$ by $2p \sin (\dot{\Omega} \delta t/2)$

Increment $p$ by $2(\dot{p}/\dot{\Omega}) \sin (\dot{\Omega} \delta t/2)$ or

---
Decrement $p^+$ by $p/d$
Increment $p$ by $p^{30}/d$
--- where $$p^+$$

is the "pseudo-velocity", proportional to velocity but equal dimensionally and in magnitude to the radius, and d is an integer power of two which now determines $\delta t$:

$\delta t = (2/\dot{\Omega})$ arc sin $(1/2d)$

Although leapfrog integration can be made exact for circular motion or for any motion that is a sinusoidal function of the independent variable, the GPS satellite's position in its orbit is not generally exactly circular nor a sinusoidal function of time. Thus, numerical integration is subject to rapidly accumulating error as the step size increases. To maintain acceptable accuracy, the step size needs to be relatively small, which incurs the corresponding computer load penalty. For these reasons, numerical integration is not practical for GPS navigation systems.

Thus, what is required is a highly accurate method for calculating the positions of orbiting GPS satellites. What is further required is a computationally efficient method of calculating orbital position which provides high accuracy with a minimal demand for computation resources. The required method should provide for the computation of satellite positions in less time, or with a less powerful computer system, or both. What is further required is a method for calculating the positions of orbiting GPS satellites, or any satellite, which does not lose accuracy for larger step sizes, allowing the step size to be as large as the sample spacing wanted for interpolation. The present invention provides a novel solution to the above requirements.

DISCLOSURE OF THE INVENTION

The present invention provides a highly accurate method for calculating the positions of orbiting GPS satellites. The present invention provides a computationally efficient method of calculating orbital position, which provides high accuracy with a minimal demand for computation resources. In addition, the present invention provides for the computation of orbital parameters in less time, or with a less powerful computer system, or both. The present invention further provides a method for calculating the positions of orbiting GPS satellites which does not lose accuracy for larger step sizes, allowing the step size to be as large as the sample spacing wanted for interpolation. The method of the present invention allows the samples to be spaced closer to permit the use of a simpler interpolation scheme.

In one embodiment, the system of the present invention comprises a GPS navigation receiver which calculates the GPS satellites' positions by numerical integration. The GPS receiver of the present invention integrates over eccentric anomaly as an independent variable rather than time, in order to use an integration method that is exact for sinusoidal motion, since the components of motion and time are sinusoidally related to the eccentric anomaly E.

An initial set of samples are determined via ICD-GPS-200 equations. New samples are subsequently calculated from the initial set in terms of eccentric anomaly. The resulting samples are evenly spaced with respect to eccentric anomaly and almost evenly spaced with respect to time. In so doing, the method of the present invention provides accurate GPS satellite positions using a numerical integration technique even though the motions of the GPS satellites are not circular and are not sinusoidal as functions of time. Calculating the new samples in terms of eccentric anomaly allows the step size between samples to be relatively large, for example, as large as the sample spacing, and thus, greatly decrease the computational load on the GPS receiver. In addition, the method of the present invention obtains the benefits of the large step size without losing accuracy. For example, the numerical integration of the present invention is exact, even over the longest, six-hour ephemeris duration of a GPS satellite.

BRIEF DESCRIPTION OF THE DRAWINGS

The accompanying drawings, which are incorporated in and form a part of this specification, illustrate embodiments of the invention and, together with the description, serve to explain the principles of the invention.

Prior art

DETAILED DESCRIPTION OF THE INVENTION

Figure 1:
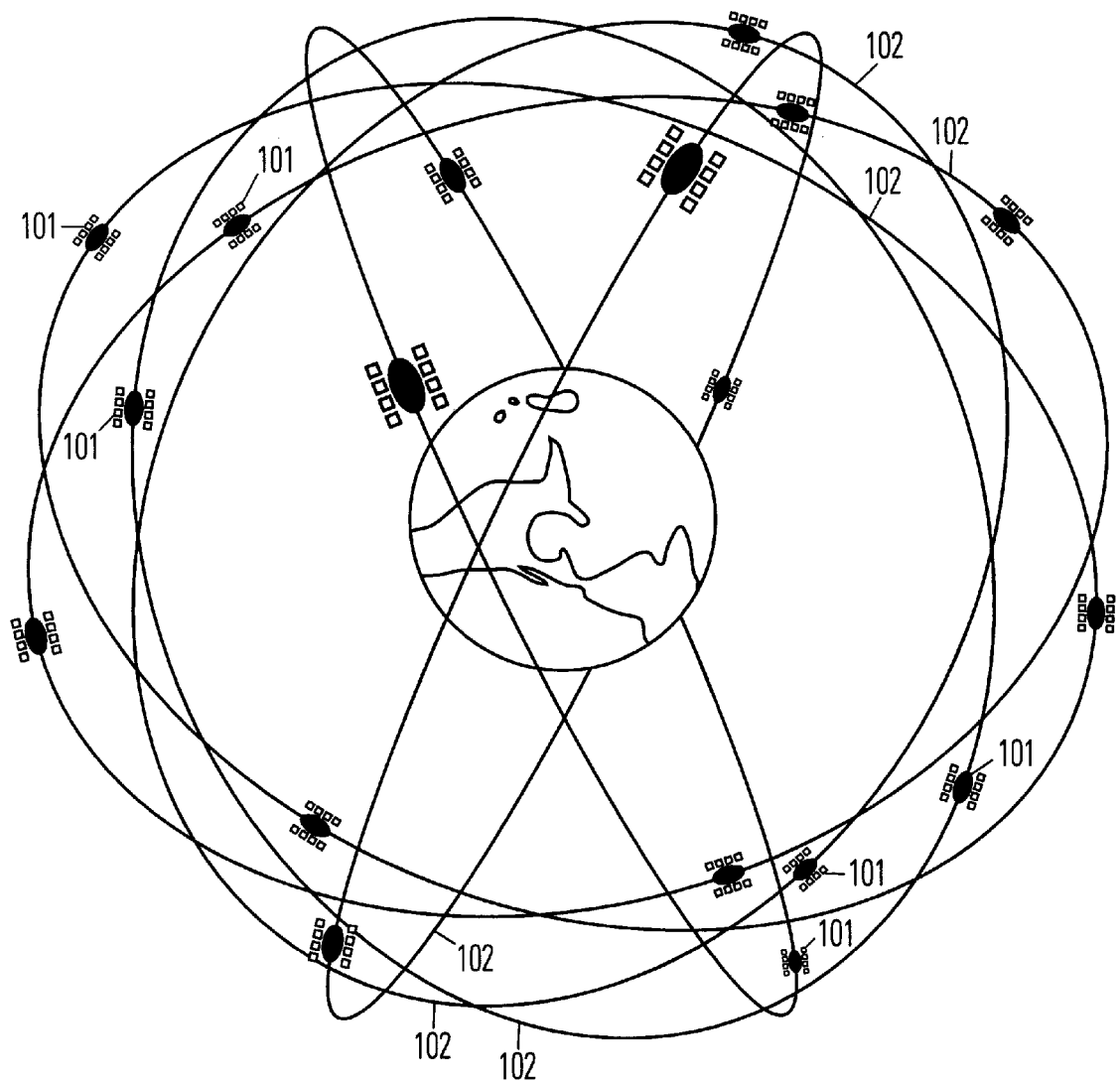
FIG. 1 shows a constellation of GPS satellites in orbit.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail so as not unnecessarily to obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to convey most effectively the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "translating," "processing," "compiling," "returning," "storing," "writing," "caching," or the like, refer to the action and processes of a computer system (e.g., 212 of FIG. 2), or similar electronic computing device, that manipulates and transforms data represented as physical (electronic) quantities within the computer system's registers and memories into other data similarly represented as physical quantities within the computer system memories or registers or other such information storage, transmission, or display devices.

The present invention provides a highly accurate method for calculating the positions of orbiting GPS satellites. The present invention provides a computationally efficient method of calculating orbital position, which provides high accuracy with a minimal demand for computation resources. In addition, the present invention provides for the computation of samples in less time, or with a less powerful computer system, or both. The present invention further provides a method for calculating the positions of orbiting GPS satellites which does not lose accuracy for larger step sizes, allowing the step size to be as large as the sample spacing wanted for interpolation. The method of the present invention allows the samples to be spaced closer to permit the use of a simpler interpolation scheme. The present invention and its benefits are further described below.

Figure 2:
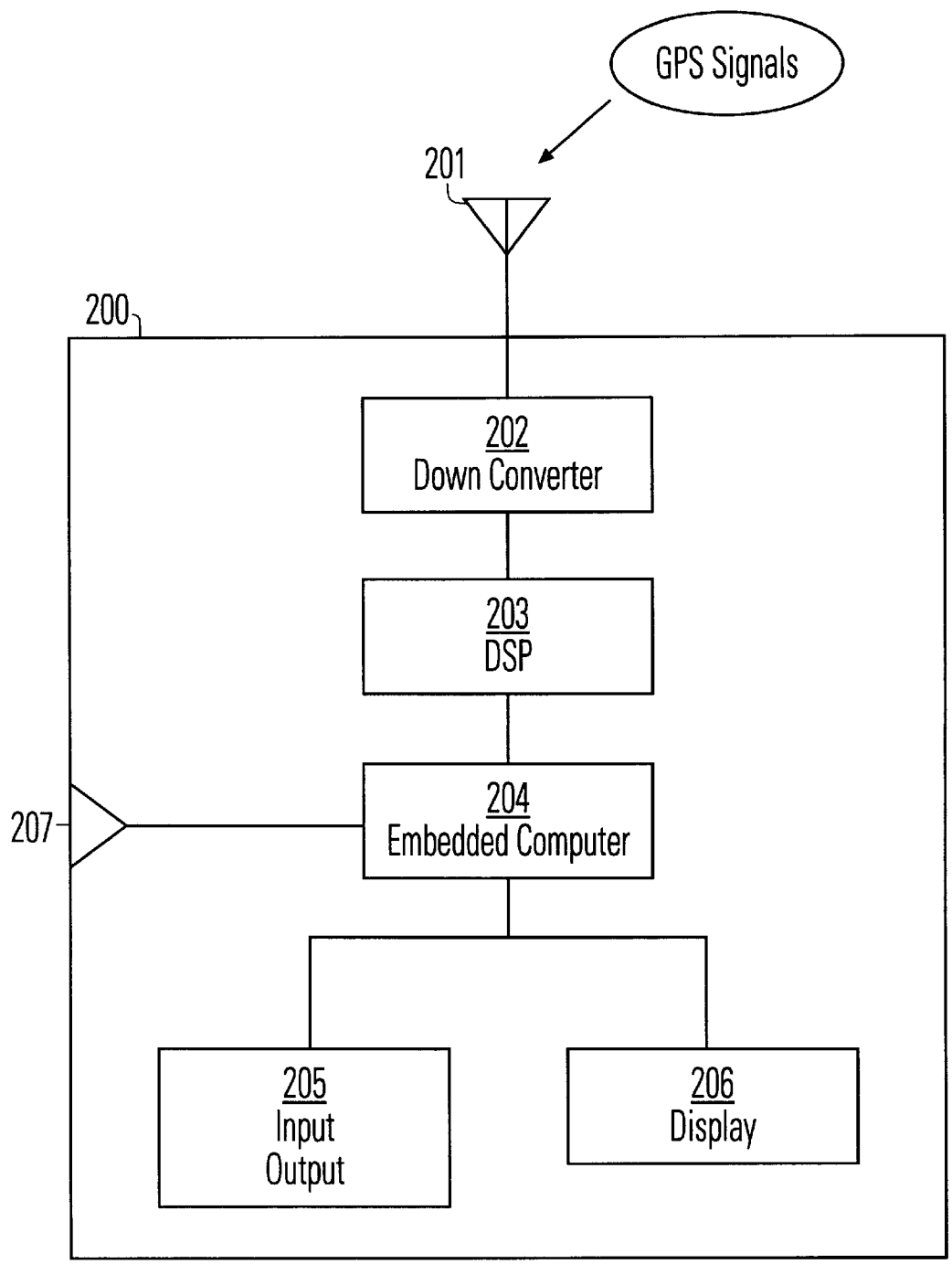
FIG. 2 shows a GPS receiver in accordance with one embodiment of the present invention.

Referring now to FIG. 2, a GPS receiver 200 in accordance with one embodiment of the present invention is shown. GPS receiver 200 is designed to function with GPS satellites 101 of FIG. 1. GPS receiver 200 receives GPS signals from GPS constellation 100 via antenna 201. The GPS signals are down converted, via down converter 202, then de-spread and demodulated by the digital signal processor (DSP) 203, and passed to embedded computer 204, which computes the correct pseudo ranges and determines the GPS-based position. Information, such as, for example, present position and navigation information, can be communicated to the user via an optional display 206. GPS receiver 200 can be configured via an optional user input output 205 (e.g., a keyboard or joystick). The GPS-based position and other navigation information are communicated to system 200 via communications port 207. Additionally, communications port 207 can be one of many well known interface standards in use in the electronics field (e.g., RS-232, ARINC 429, ARINC 629, Milstd 1553, and the like).

Figure 3:
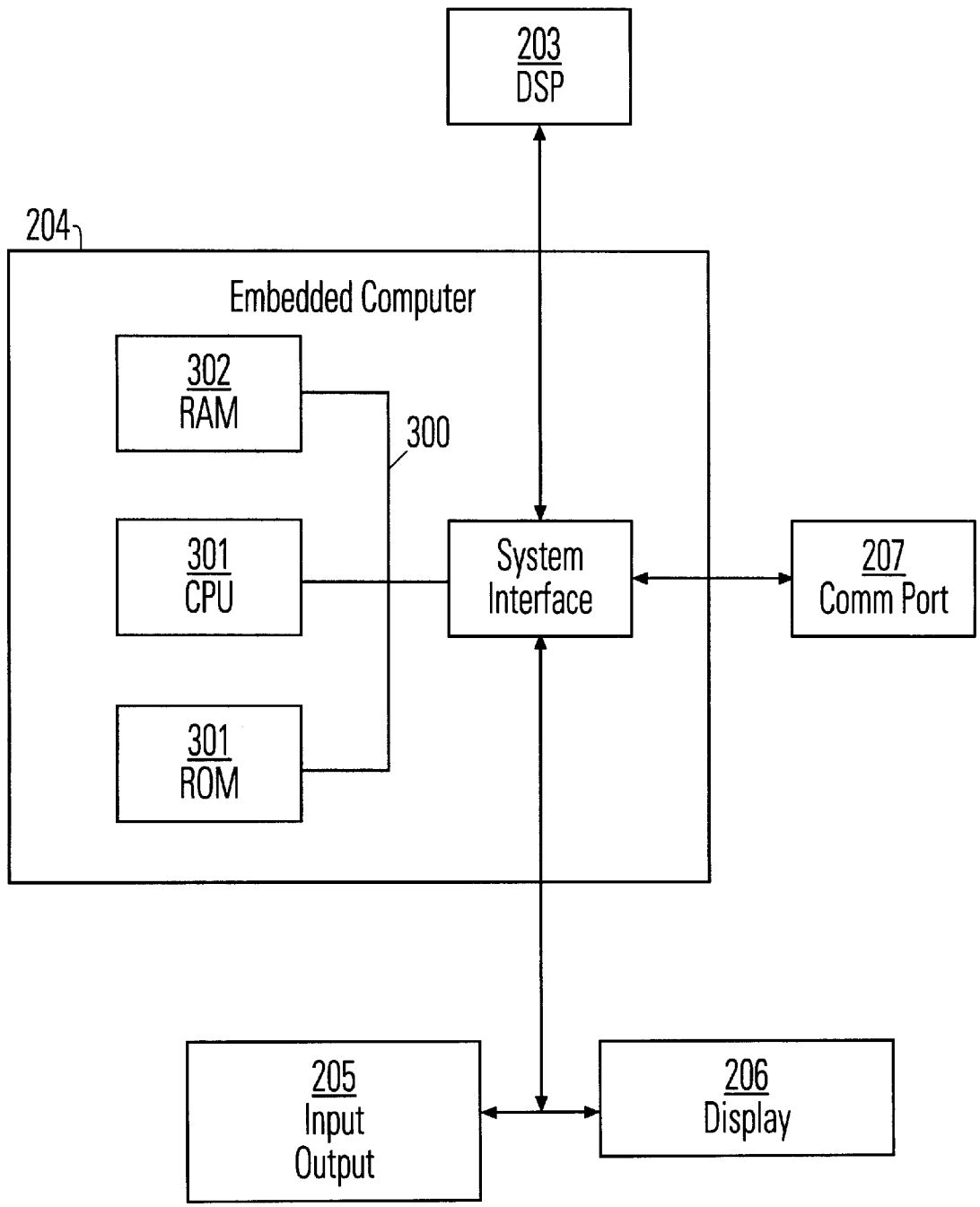
FIG. 3 shows a diagram of an embedded computer included in the GPS receiver of FIG. 2.

FIG. 3 shows a more detailed diagram of embedded computer 204 of FIG. 2. As described above, GPS receiver 200 includes sufficient computational resources to host software programs which implement the features and functions of the present invention. In the present embodiment, this software is executed on the computer system platform provided by embedded computer 204. Although a variety of different computer systems can be used with the present invention, an exemplary general purpose computer system is shown in the embedded computer 204 of FIG. 3.

In general, embedded computer 204 comprises an address/data bus 300 for communicating information, a CPU (central processor unit) 301 coupled with the bus 300 for processing information and instructions, RAM 302 (e.g., random access memory, static RAM, dynamic, a computer readable volatile memory unit, etc.) coupled with the bus 300 for storing information and instructions for the CPU 301, a computer readable non-volatile memory unit (e.g., read only memory, programmable ROM, flash memory, EPROM, EEPROM, etc.) 303 coupled with the bus 300 for storing static information and instructions for CPU 301.

Within the following discussions of the present invention, certain processes and steps are discussed that are realized, in one embodiment, as a series of instructions (e.g., software program) that reside within RAM 302 and CPU 301 and executed by CPU 301 of embedded computer system 204. When executed by embedded computer system 204, the instructions cause GPS receiver 200 of FIG. 2 to perform specific actions and exhibit the specific functionality, features, and behavior described below.

In one embodiment, the system of the present invention comprises a GPS navigation receiver (e.g., GPS receiver 200) which implements a highly accurate method for calculating the positions of orbiting GPS satellites. In accordance with the method of the present invention, GPS receiver 200 integrates over eccentric anomaly E as an independent variable rather than time, in order to use an integration method that is exact for sinusoidal motion, since the components of motion and time are sinusoidally related to the eccentric anomaly E. In so doing, the method of the present invention, via GPS receiver 200 of FIG. 2, provides a new process of calculating satellite position samples suitable for interpolation that is much faster than ICD-GPS-200.

Exact integration, by definition, loses no accuracy whether the iteration interval is relatively short or long. In fact, a long interval is an advantage since it slows the accumulation of computational errors. One embodiment of the method of the present invention (hereafter the preferred embodiment), therefore, makes the iteration rate the same as the desired sample rate, one iteration per sample.

The method of the present invention exploits the fact that both a satellite's position and the time when it is at that position are simply related to sinusoidal functions of the eccentric anomaly E. Accordingly, the method of the present invention replaces time by eccentric anomaly E as the independent variable for numerical integration and integrates the orbit, exactly, by the leapfrog method. The integration is exact, even over the longest, six-hour ephemeris duration. The samples thus computed are spaced uniformly in eccentric anomaly E, and very nearly uniformly in time for the almost circular GPS orbit.

The full solution requires second-harmonic corrections and an inclination-rate adjustment. Rather than explicitly computing the trigonometric functions that ICD-GPS-200 calls for, the method of the present invention infers them from the coordinates of the previously-computed Keplerian orbit.

Finally, the present invention rotates the solution by longitude into earth-centered, earth-fixed coordinates. A second leapfrog integration generates the sine and cosine of the longitude of the ascending node as a function of time. Interpolation between sine-cosine samples provides the sine and cosine of longitude at the time corresponding to the orbital sample's time-tag.

The preferred embodiment of the method of the present invention maintains four samples, numbered 1, 2, 3, and 4. It interpolates between samples 2 and 3; and, when the time of sample 3 is past, it shifts the samples, renaming sample 2 as sample 1, sample 3 as sample 2, and sample 4 as sample 3. It then advances the leapfrog integration to take another sample which becomes a new sample 4.

To start this process, the preferred embodiment arranges for the initial times of samples 1, 2, 3, and 4 to be such that the time T given for the first fix lies between samples 2 and 3. To do this, the preferred embodiment first subtracts the reference time $T_0$ from the given time T:

$$t = T - T_0$$

The preferred embodiment multiples this ephemeris time t by the mean motion n and adds it to the reference-time mean anomaly $M_0$ to get mean anomaly M at the given time T:

$$M = M_0 + nt$$

The preferred embodiment estimates the corresponding eccentric anomaly E to within 4 seconds by substituting mean anomaly M for E as the argument of the sine function in an approximate version of Kepler's equation:

$$E = M + e \sin M$$

The preferred embodiment subtracts 1.5 integration steps $\delta E$ to get the sample 1 eccentric anomaly $E_1$:

$$E_1 = E - 1.5\, \delta E$$

The integration step of the preferred embodiment is about 54 seconds, corresponding to a leapfrog-integration divisor of 128. An embodiment using an integration step $\delta E$ smaller than 8 seconds would require a more accurate conversion from mean anomaly M to eccentric anomaly E, by any of various methods well known to those skilled in the art, such as the iterative solution of Kepler's equation.

The preferred embodiment initializes the eccentric time $t_{ecc}$, which is simply the eccentric anomaly converted to units of time by division by the mean motion, to the eccentric time of sample 1:

$$t_{ecc} = (E_1 - M_0)/n$$

The preferred embodiment initializes the orbital leapfrog variables to correspond to the sample 1 eccentric anomaly $E_1$:

$$x_{1f} = a \cos E_1 \cos \omega - b \sin E_1 \sin \omega$$

$$y_{1f} = (a \cos E_1 \sin \omega + b \sin E_1 \cos \omega) \cos I_0$$

$$z_{1f} = (a \cos E_1 \sin \omega + b \sin E_1 \cos \omega) \sin I_0$$

$$r_{1f} = -ae \cos E_1$$

$$t_{1f} = e \sin E_1 / n$$

The preferred embodiment initializes pseudo-velocities one-half step farther into the past:

$$E_{0.5} = E_1 - 0.5\, \delta E$$

$$x_{pv} = -a \sin E_{0.5} \cos \omega - b \cos E_{0.5} \sin \omega$$

$$y_{pv} = (-a \sin E_{0.5} \sin \omega + b \cos E_{0.5} \cos \omega) \cos i_0$$

$$z_{pv} = (-a \sin E_{0.5} \sin \omega + b \cos E_{0.5} \cos \omega) \sin i_0$$

$$r_{pv} = ae \sin E_{0.5}$$

$$t_{pv} = e \cos E_{0.5}/n$$

The preferred embodiment computes longitude sample 2 so that orbital sample 1 lies between longitude samples 1 and 2:

$$t_{lon,2} = (E_1 - e \sin E_1 - M_0)/n + 0.5\, \delta t_{lon}$$

The preferred embodiment initializes the cosine and sine of the longitude of the ascending node:

$$\Omega_2 = \Omega_0 + \dot\Omega t_{lon,2} - \Omega_e T$$

$$c_{1f} = \cos \Omega_2$$

$$s_{1f} = \sin \Omega_2$$

The preferred embodiment initializes the longitude pseudo-velocities one-half longitude step farther into the past:

$$\Omega_{1.5} = \Omega_2 - 0.5\, \dot\Omega\, \delta t_{lon}$$

$$c_{pv} = \sin \Omega_{1.5}$$

$$s_{pv} = \cos \Omega_{1.5}$$

After initialization, the preferred embodiment samples the orbit at sample time 1 $t_1$. To do this, it subtracts the location of the earth from the leapfrog position, which is relative to the orbit's center:

$$x' = x_{1f} - ae \cos \omega$$

$$y' = y_{1f} - ae \sin \omega \cos i_0$$

$$z' = z_{1f} - ae \sin \omega \cos i_0$$

$$r' = r_{1f}$$

The preferred embodiment then makes the second-harmonic corrections to the sampled orbital position. It bases the corrections on the uncorrected argument of latitude $\Phi$, the angle about the earth's center from the ascending node to the satellite, and specifically on the sine and cosine of twice the argument of latitude, which it computes from the uncorrected sample without using recurring trigonometric functions:

$$\cos \Phi = x'/(a+r')$$

$$\sin \Phi = z' \csc i_0/(a+r')$$

$$\cos 2\omega = \cos^2 \omega - \sin^2 \omega$$

$$\sin 2\omega = 2 \cos \omega \sin \omega$$

The preferred embodiment corrects the argument of latitude u, scaling the correction by use of the as-yet uncorrected inclination i and using a first-order approximation that neglects until later the radial second-order component:

$$\delta u = C_{uc} \cos 2\omega + C_{us} \sin 2\omega$$

$$x'' = x' - \csc i_0 z \, \delta u$$

$$y'' = y' + \cos i_0 x \, \delta u$$

$$z'' = z' + \sin i_0 x \, \delta u$$

The preferred embodiment corrects and applies the rate $\dot{i}$ to the inclination i, using a first-order approximation that neglects until later the radial second-order component:

$$\delta i = C_{ic} \cos 2\omega + C_{is} \sin 2\omega + \dot{i} t$$

$$x''' = x''$$

$$y''' = y'' - z'' \delta i$$

$$z''' = z'' + y'' \delta i$$

The preferred embodiment exactly corrects the radius and includes the other corrections' second-order components, which amply suffice to approximate cosine and sine calculations for these very small angles:

$$x'''' = x''' + x''' \left( \frac{C_{rc} \cos 2\Phi + C_{rs} \sin 2\Phi}{a + r_{lf}} - \frac{\delta u^2}{2} \right)$$

$$y'''' = y''' + y''' \left( \frac{C_{rc} \cos 2\Phi + C_{rs} \sin 2\Phi}{a + r_{lf}} - \frac{\delta u^2}{2} - \frac{\delta i^2}{2} \right)$$

$$z'''' = z''' + z''' \left( \frac{C_{rc} \cos 2\Phi + C_{rs} \sin 2\Phi}{a + r_{lf}} - \frac{\delta u^2}{2} - \frac{\delta i^2}{2} \right)$$

While $t_{eph}$ exceeds $t_{eph,lon,2}$, that is, while the latest sample is past, the preferred embodiment does one step of leapfrog numerical integration of the sine and cosine of longitude:

$$c_{pv} = c_{pv} - 2^{-8} c_{1f}$$

$$s_{pv} = s_{pv} - 2^{-8} s_{1f}$$

$$c_{1f} = c_{1f} + 2^{-8} c_{pv}$$

$$s_{1f} = s_{1f} + 2^{-8} s_{pv}$$

and updates the longitude sample 2 time $t_{lon,2}$ to the next longitude:

$$t_{lon,2} = t_{lon,2} + \delta t_{lon}$$

In any case, the preferred embodiment interpolates linearly between longitude samples 1 and 2 and re-normalizes to get quadratic-interpolation accuracy:

$$\cos \Omega = (c_{1f} + k c_{pv})[1 - 0.5k(2^{-8} + k)]$$

$$\sin \Omega = (s_{1f} + k s_{pv})[1 - 0.5k(2^{-8} + k)]$$

where $$k = 2^{-8}(t - t_{lon,2})/\delta t_{lon}$$

The preferred embodiment then rotates the orbital sample $x_1$, $y_1$, $z_1$, $t_{eph,1}$ into earth-centered earth-fixed coordinates:

$$x_1 = x'''' \cos \Omega - y'''' \sin \Omega$$

$$y_1 = x'''' \sin \Omega + y'''' \cos \Omega$$

$$z_1 = z''''$$

$$t_1 = t_{ecc} - t_{1f}$$

Before taking the next sample, the preferred embodiment does a leapfrog integration step:

$$x_{pv} = x_{pv} - 2^{-7} x_{1f}$$

$$y_{pv} = y_{pv} - 2^{-7} y_{1f}$$

$$z_{pv} = z_{pv} - 2^{-7} z_{1f}$$

$$x_{1f} = x_{1f} + 2^{-7} x_{pv}$$

$$y_{1f} = y_{1f} + 2^{-7} y_{pv}$$

$$z_{1f} = z_{1f} + 2^{-7} z_{pv}$$

$$r_{pv} = r_{pv} - 2^{-7} r_{1f}$$

$$r_{1f} = r_{1f} + 2^{-7} r_{pv}$$

$$t_{pv} = t_{pv} - 2^{-7} t_{1f}$$

$$t_{1f} = t_{1f} + 2^{-7} t_{pv}$$

The preferred embodiment also advances eccentric time $t_{ecc}$:

$$t_{ecc} = t_{ecc} + \delta E/n$$

The preferred embodiment takes, corrects, and rotates sample 2 $x_2$, $y_2$, $z_2$, $t_{eph,2}$ in the same way as it did sample 1; integrates again, takes, corrects, and rotates sample 3 in the same way as it did samples 1 and 2; integrates again, and finally takes, corrects, and rotates sample 4 in the same way as samples 1, 2, and 3.

Then the preferred embodiment fits a quadratic polynomial to the samples. To do this, it computes first and second derivatives:

$$\left(\frac{dx}{dt}\right)_{12} = \frac{x_2 - x_1}{t_2 - t_1} \quad \left(\frac{dy}{dt}\right)_{12} = \frac{y_2 - y_1}{t_2 - t_1} \quad \left(\frac{dz}{dt}\right)_{12} = \frac{z_2 - z_1}{t_2 - t_1}$$

$$\left(\frac{dx}{dt}\right)_{23} = \frac{x_3 - x_2}{t_3 - t_2} \quad \left(\frac{dy}{dt}\right)_{23} = \frac{y_3 - y_2}{t_3 - t_2} \quad \left(\frac{dz}{dt}\right)_{23} = \frac{z_3 - z_2}{t_3 - t_2}$$

$$\left(\frac{dx}{dt}\right)_{34} = \frac{x_4 - x_3}{t_4 - t_3} \quad \left(\frac{dy}{dt}\right)_{34} = \frac{y_4 - y_3}{t_4 - t_3} \quad \left(\frac{dz}{dt}\right)_{34} = \frac{z_4 - z_3}{t_4 - t_3}$$

$$\left(\frac{d^2 x}{dt^2}\right)_2 = 2 \frac{\left(\frac{dx}{dt}\right)_{23} - \left(\frac{dx}{dt}\right)_{12}}{t_3 - t_1}$$

$$\left(\frac{d^2 y}{dt^2}\right)_2 = 2 \frac{\left(\frac{dy}{dt}\right)_{23} - \left(\frac{dy}{dt}\right)_{12}}{t_3 - t_1}$$

$$\left(\frac{d^2 z}{dt^2}\right)_2 = 2 \frac{\left(\frac{dz}{dt}\right)_{23} - \left(\frac{dz}{dt}\right)_{12}}{t_3 - t_1}$$

$$\left(\frac{d^2 x}{dt^2}\right)_3 = 2 \frac{\left(\frac{dx}{dt}\right)_{34} - \left(\frac{dx}{dt}\right)_{23}}{t_4 - t_2}$$

$$\left(\frac{d^2 y}{dt^2}\right)_3 = 2 \frac{\left(\frac{dy}{dt}\right)_{34} - \left(\frac{dy}{dt}\right)_{23}}{t_4 - t_2}$$

$$\left(\frac{d^2 z}{dt^2}\right)_3 = 2 \frac{\left(\frac{dz}{dt}\right)_{34} - \left(\frac{dz}{dt}\right)_{23}}{t_4 - t_2}$$

The preferred embodiment uses the second derivatives to compute quadratic interpolation coefficients:

$$c_{2,x} = \frac{\left(\frac{d^2 x}{dt^2}\right)_2 + \left(\frac{d^2 x}{dt^2}\right)_3}{4} \quad c_{2,y} = \frac{\left(\frac{d^2 y}{dt^2}\right)_2 + \left(\frac{d^2 y}{dt^2}\right)_3}{4}$$

$$c_{2,z} = \frac{\left(\frac{d^2 z}{dt^2}\right)_2 + \left(\frac{d^2 z}{dt^2}\right)_3}{4}$$

The preferred embodiment computes the linear interpolation coefficients from the quadratic:

$$c_{1,x} = \left(\frac{dx}{dt}\right)_{23} + c_{2,x}(t_3 - t_2)$$

$$c_{1,y} = \left(\frac{dy}{dt}\right)_{23} + c_{2,y}(t_3 - t_2)$$

$$c_{1,z} = \left(\frac{dz}{dt}\right)_{23} + c_{2,z}(t_3 - t_2)$$

The preferred embodiment uses sample 3 for the constant term:

$$c_{0,x} = x_3$$

$$c_{0,y} = y_3$$

$$c_{0,z} = z_3$$

The preferred embodiment approximates the quadratic velocity coefficients:

$$c_{2,\dot{x}} = \frac{\left(\frac{d^2 x}{dt^2}\right)_3 - \left(\frac{d^2 x}{dt^2}\right)_2}{2(t_3 - t_2)} \quad c_{2,\dot{y}} = \frac{\left(\frac{d^2 y}{dt^2}\right)_3 - \left(\frac{d^2 y}{dt^2}\right)_2}{2(t_3 - t_2)}$$

$$c_{2,\dot{z}} = \frac{\left(\frac{d^2 z}{dt^2}\right)_3 - \left(\frac{d^2 z}{dt^2}\right)_2}{2(t_3 - t_2)}$$

The preferred embodiment differentiates the position polynomial, corrected for the quadratic coefficients, for the linear and constant velocity terms:

$$c_{1,\dot{x}} = 2c_{2,x} + (t_3 - t_2)c_{2,\dot{x}}$$

$$c_{1,\dot{y}} = 2c_{2,y} + (t_3 - t_2)c_{2,\dot{y}}$$

$$c_{1,\dot{z}} = 2c_{2,z} + (t_3 - t_2)c_{2,\dot{z}}$$

$$c_{0,\dot{x}} = c_{1,x} + \frac{(t_3 - t_2)c_{2,\dot{x}}}{6}$$

$$c_{0,\dot{y}} = c_{1,y} + \frac{(t_3 - t_2)c_{2,\dot{y}}}{6}$$

$$c_{0,\dot{z}} = c_{1,z} + \frac{(t_3 - t_2)c_{2,\dot{z}}}{6}$$

The preferred embodiment then takes a fix by subtracting the time of sample 3 $t_3$ from the given ephemeris time t and applying the resulting time to the interpolation polynomials:

$$t' = t - t_3$$

$$x = (c_{2,x}t' + c_{1,x})t' + c_{0,x}$$

$$y = (c_{2,y}t' + c_{1,y})t' + c_{0,y}$$

$$z = (c_{2,z}t' + c_{1,z})t' + c_{0,z}$$

$$\dot{x} = (c_{2,\dot{x}}t' + c_{1,\dot{x}})t' + c_{0,\dot{x}}$$

$$\dot{y} = (c_{2,\dot{y}}t' + c_{1,\dot{y}})t' + c_{0,\dot{y}}$$

$$\dot{z} = (c_{2,\dot{z}}t' + c_{1,\dot{z}})t' + c_{0,\dot{z}}$$

For subsequent fixes, the preferred embodiment computes the ephemeris time t from each new given time T, then finds the time t' relative to sample 3:

$$t = T - T_0$$

$$t' = t - t_3$$

If t' is not positive, indicating that the given time is not yet past $t_3$, the preferred embodiment simply repeats the interpolation computation using the same polynomials as before. If t' is positive, the preferred embodiment shifts the samples and their derivatives, renaming sample 2 as sample 1, sample 3 as sample 2, and sample 4 as sample 3. It then advances the leapfrog integration to take another sample which becomes a new sample 4, computes new interpolation polynomials, and interpolates.

Figure 4:
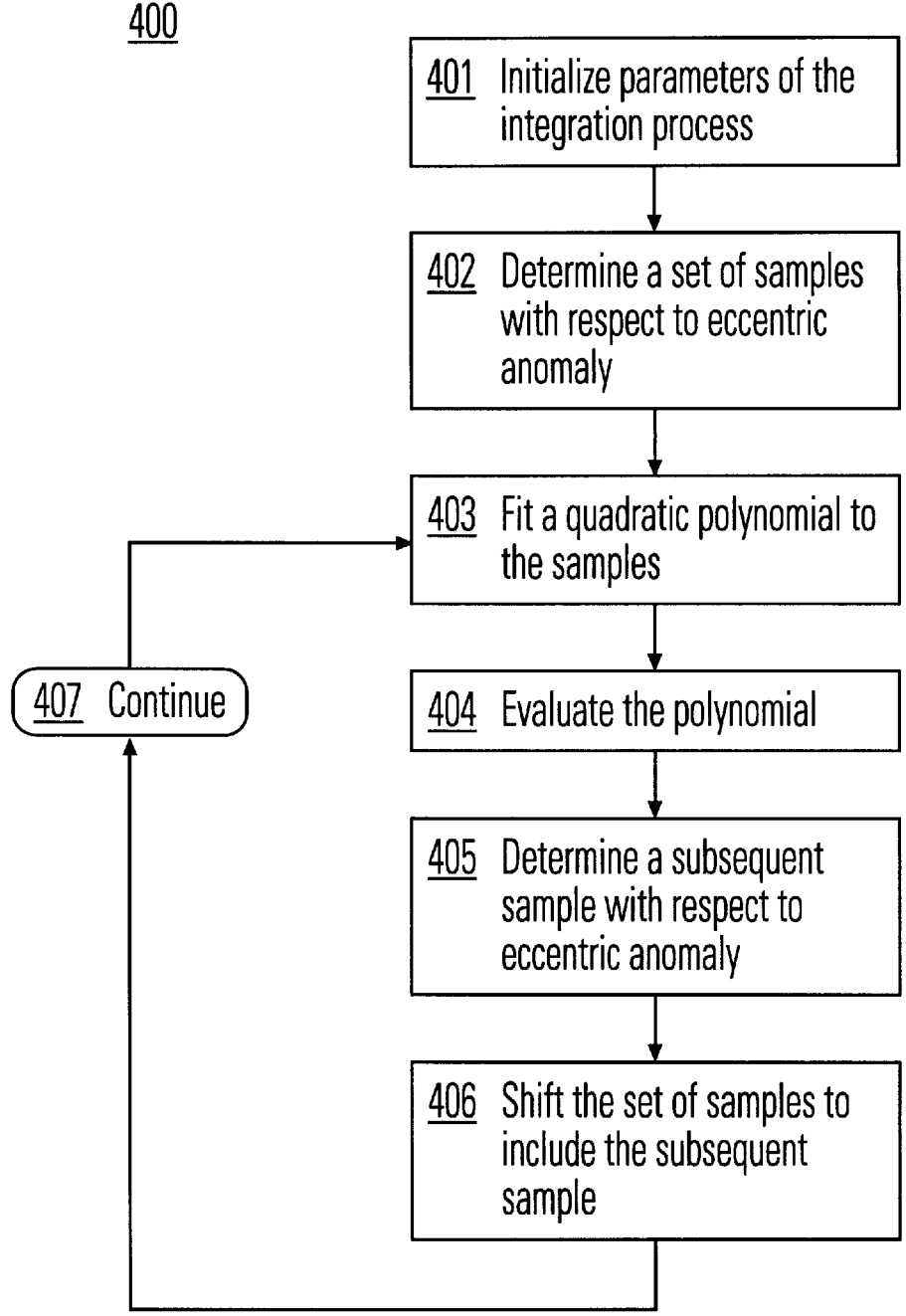
FIG. 4 shows a flow chart of the steps of a method in accordance with one embodiment of the present invention.

With reference now to FIG. 4, a flow chart of the steps of a method 400 in accordance with one embodiment of the present invention is shown. Method 400 is an exemplary operating process of the steps performed by a GPS receiver (e.g., GPS receiver 200) in accordance with the present invention. As such, it should be appreciated that process 400 is but one of numerous processes within the scope of the present invention.

In step 401, a GPS receiver in accordance with one embodiment of the present invention (e.g., GPS receiver 200) initializes the times of samples to correspond to an equivalent eccentric time. As described above, eccentric time is eccentric anomaly converted to units of time, as is accomplished by dividing eccentric anomaly by mean motion.

In step 402, GPS receiver 200 determines the initial 4 samples in accordance with one embodiment of the present invention. As described above, GPS receiver 200 computes a set (e.g., 4) of samples with respect to eccentric anomaly. GPS receiver 200 arranges for the initial times of 4 samples (e.g., 1 through 4) such that the time for the first GPS satellite position fix lies between samples 2 and 3.

In step 403, a quadratic polynomial is fitted to the 4 samples. As described above, the 4 samples can be used to define a quadratic polynomial, which in turn, allows the interpolation of new samples between the 4 samples.

In step 404, GPS receiver 200 evaluates the polynomial. As described above, this evaluation proceeds to a point in time past sample three.

In step 405, the process of the present invention determines a subsequent sample with respect to eccentric anomaly. As described above, GPS receiver 200 interpolates linearly between samples 1 and 2 to determine a subsequent sample. This subsequent sample, as with the initial 4 samples, is defined in terms of eccentric anomaly.

In step 406, the set of samples is time shifted to include the new subsequent sample. The earliest sample is discarded, such that 4 samples, including the new, subsequent sample, remain. The process of the present invention then continues, as shown by step 407, by fitting a new quadratic polynomial to the 4 samples, and so on, through steps 404, 405, and 406. In this manner, the process of the present invention allows GPS receiver 200 to compute samples for the GPS satellites in much less time in comparison to the prior art.

Figure 5:
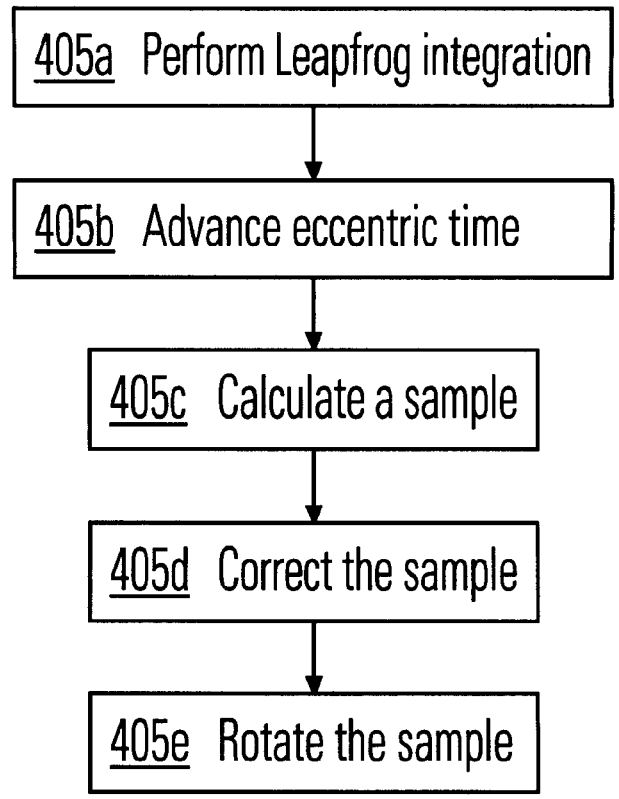
FIG. 5 shows a flow chart of the steps of a process which in turn comprises one step of the method from FIG. 4.

Referring now to FIG. 5, the steps of a process which comprises step 405 of FIG. 4 are shown. As described above in step 405, GPS receiver 200 determines a subsequent sample with respect to eccentric time. The steps 405a–405e depict the process of determining a sample (e.g., the subsequent sample from step 405 of FIG. 4) in greater detail.

In step 405a, GPS receiver 200 performs Leapfrog integration to determine the sample, as described above.

In step 405b, eccentric time for the sample is advanced.

In step 405c, GPS receiver 200 calculates the sample. As described above, GPS receiver 200 calculates the coordinates of the sample in the given coordinate system (e.g., x, y, z).

In step 405d, GPS receiver 200 corrects the sample. As described above, GPS receiver 200 performs second-harmonic corrections to the sample, corrects the argument of latitude, corrects the inclination, and the like, of the sample.

In step 405e, GPS receiver 200 rotates the sample into earth-centered, earth-fixed coordinates. This references the sample with respect to the earth's surface as it rotates beneath the GPS satellites.

After step 405e, the process of the present invention proceeds to step 406 of FIG. 4. In this manner, new samples are continually computed.

Thus, the present invention provides a highly accurate method for calculating the positions of orbiting GPS satellites. The present invention provides a computationally efficient method of calculating orbital position, which provides high accuracy with a minimal demand for computation resources. In addition, the present invention provides for the computation of samples in less time, or with a less powerful computer system, or both. The present invention further provides a method for calculating the positions of orbiting GPS satellites which does not lose accuracy for larger step sizes, allowing the step size to be as large as the sample spacing wanted for interpolation. The method of the present invention allows the samples to be spaced closer to permit the use of a simpler interpolation scheme.

Although the present invention has been described in terms of the presently preferred embodiment, it is to be understood that the disclosure is not to be interpreted as limiting. Various alterations and modifications will no doubt become apparent to those skilled in the art after having read the above disclosure. For example, the method is as applicable to natural or artificial satellites of any celestial body as to GPS satellites of the earth. Accordingly, the embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. In a global positioning system (GPS) receiver, a method for efficiently calculating a plurality of samples of the position of an orbiting GPS satellite, wherein the GPS receiver includes a processor coupled to a computer readable memory storing computer readable instructions which, when executed by the processor, cause the GPS receiver to execute the method, the method comprising the steps of:

calculating a time tagged first sample of the orbital position of a GPS satellite in terms of eccentric anomaly;

calculating a time tagged second sample of the orbital position of said GPS satellite in terms of eccentric anomaly; and determining a subsequent sample of the orbital position of said GPS satellite, wherein said subsequent sample is uniformly spaced with respect to said first sample and said second sample in terms of eccentric anomaly.

2. The method of claim 1, wherein said second sample and said subsequent sample are determined by integrating said first sample and said second sample using eccentric anomaly as an independent variable, and wherein said integrating is performed using leapfrog integration.

3. The method of claim 2, further comprising the steps of:
integrating the earth's rotation over time with respect to said subsequent sample by using leapfrog integration, yielding an integrated rotation;
interpolating to a time to any of said first sample said second sample or said subsequent sample by fitting a curve to samples of said integrated rotation; and
using said integrated rotation to rotate said subsequent sample into earth-centered earth-fixed coordinates.

4. The method of claim 3, further comprising the step of:
interpolating in position to a desired time by fitting a curve to integrated positions of said first sample, said second sample, and said subsequent sample.

5. The method of claim 3, further comprising the step of:
interpolating in velocity to a desired time by fitting a curve to integrated positions of said first sample, said second sample, and said subsequent sample.

6. The method of claim 3, further comprising the step of:
interpolating in one of a plurality of desired higher derivatives of position to a desired time by fitting curve to integrated positions of said first sample, said second sample, and said subsequent sample.

7. A global positioning system (GPS) receiver adapted to efficiently calculate a plurality of samples of the position of a GPS satellite, the wherein the samples are used by the GPS receiver to determine accurate GPS positioning information, comprising:

a processor included within said GPS receiver;

a memory coupled to said processor, said memory adapted to store computer readable instructions which, when executed by the processor, cause the GPS receiver to execute a method, the method comprising the steps of:

calculating a time tagged first sample of the orbital position of a GPS satellite in terms of eccentric anomaly;

calculating a time tagged second sample of the orbital position of said GPS satellite in terms of eccentric anomaly; and determining a subsequent sample of the orbital position of said GPS satellite, wherein said subsequent sample is uniformly spaced with respect to said first sample and said second sample in terms of eccentric anomaly.

8. The system of claim 7, wherein said second sample and said subsequent sample are determined by integrating said first sample and said second sample using eccentric anomaly as an independent variable, and wherein said integrating is performed using leapfrog integration.

9. The system of claim 8, wherein said method further comprises the steps of:

integrating the earth's rotation over time with respect to said subsequent sample by using leapfrog integration, yielding an integrated rotation;

interpolating to a time for any of said first sample, said second sample, or said subsequent sample by fitting a curve to samples of said integrated rotation; and using said integrated rotation to rotate said subsequent sample into earth-centered earth-fixed coordinates.

10. The system of claim 9, wherein said method further comprises the step of:

interpolating in position to a desired time by fitting a curve to integrated positions of said first sample, said second sample, and said subsequent sample.

11. The system of claim 9, wherein said method further comprises the step of:

interpolating in velocity to a desired time by fitting a curve to integrated positions of said first sample, said second sample, and said subsequent sample.

12. The system of claim 9, wherein said method further comprises the step of:

interpolating in one of a plurality of desired higher derivatives of position to a desired time by fitting curve to integrated positions of said first sample, said second sample, and said subsequent sample.

13. A computer readable memory storing computer readable instructions, wherein the computer readable instructions, when executed by a computer system, cause the computer system to implement a method for efficiently calculating a plurality of samples of the position of an orbiting satellite, the method comprising the steps of:

calculating a time tagged first sample of the orbital position of a satellite in terms of eccentric anomaly;

calculating a time tagged second sample of the orbital position of said satellite in terms of eccentric anomaly; and determining a subsequent sample of the orbital position of said satellite, wherein said subsequent sample is uniformly spaced with respect to said first sample and said second sample in terms of eccentric anomaly.

14. The method of claim 13, wherein said second sample and said subsequent sample are determined by integrating the orbital position of said first sample and the orbital position of said second sample using eccentric anomaly as an independent variable, and wherein said integrating is performed using leapfrog integration.

15. The method of claim 14, further comprising the steps of:

integrating the earth's rotation over time with respect to said subsequent sample by using leapfrog integration, yielding an integrated rotation;

interpolating to a time for any of said first sample, said second sample, or said subsequent sample by fitting a curve to samples of said integrated rotation; and using said integrated rotation to rotate said subsequent sample into earth-centered earth-fixed coordinates.

16. The method of claim 15, further comprising the step of:

interpolating in position to a desired time by fitting the curve to integrated positions of said first sample, said second sample, and said subsequent sample.

17. The method of claim 15, further comprising the step of:

interpolating in velocity to a desired time by fitting the curve to integrated positions of said first sample, said second sample, and said subsequent sample.

18. The method of claim 15, further comprising the step of:

interpolating in one of a plurality of desired higher derivatives of position to a desired time by fitting the curve to integrated positions of said first sample, said second sample, and said subsequent sample.

19. The method of claim 13, wherein said computer system is included within a GPS (global positioning system) receiver and wherein said satellite is a GPS satellite.

* * * * *